(12) United States Patent
Zhang et al.

(10) Patent No.: US 12,025,497 B2
(45) Date of Patent: Jul. 2, 2024

(54) HIGH-RESOLUTION SPECTRAL IMAGE FAST ACQUISITION APPARATUS AND METHOD

(71) Applicant: Tsinghua Shenzhen International Graduate School, Guangdong (CN)

(72) Inventors: Yongbing Zhang, Guangdong (CN); Kaifa Xin, Guangdong (CN); Xiangyang Ji, Guangdong (CN); Haoqian Wang, Guangdong (CN)

(73) Assignee: TSINGHUA SHENZHEN INTERNATIONAL GRADUATE SCHOOL, Guangdong (CN)

( * ) Notice: Subject to any disclaimer, the term of this patent is extended or adjusted under 35 U.S.C. 154(b) by 261 days.

(21) Appl. No.: 17/663,755

(22) Filed: May 17, 2022

(65) Prior Publication Data

US 2022/0276093 A1    Sep. 1, 2022

Related U.S. Application Data

(63) Continuation of application No. PCT/CN2021/105716, filed on Jul. 12, 2021.

(30) Foreign Application Priority Data

Aug. 31, 2020   (CN) .......................... 202010896214.7

(51) Int. Cl.
   *G01J 3/28*    (2006.01)
   *G01J 3/02*    (2006.01)
(52) U.S. Cl.
   CPC .......... *G01J 3/2823* (2013.01); *G01J 3/0208* (2013.01); *G01J 3/0216* (2013.01)

(58) Field of Classification Search
   None
   See application file for complete search history.

(56) References Cited

U.S. PATENT DOCUMENTS

2012/0127334 A1    5/2012   Imai
2016/0320602 A1    11/2016  Kazemzadeh et al.

FOREIGN PATENT DOCUMENTS

CN    102735338 A    10/2012
CN    106595863 A    4/2017
(Continued)

OTHER PUBLICATIONS

International Search Report (with English translation) and Written Opinion issued in PCT/CN2021/105716, dated Oct. 20, 2021, 12 pages provided.

*Primary Examiner* — Rufus L Phillips
(74) *Attorney, Agent, or Firm* — HSML P.C.

(57) ABSTRACT

A high-resolution spectral image fast acquisition apparatus comprises an illumination source, an objective lens, a beam splitter, a single shot spectral image acquisition assembly and a reference image acquisition assembly, wherein the objective lens is used to align a sample to be measured; the illumination source is used to project an illumination light onto the sample to be measured so that the sample to be measured is amplified by the objective lens; wherein one part of amplified light enters the single shot spectral image acquisition assembly so as to acquire a low-resolution spectral cube of the sample to be measured, and another part of the amplified light enters the reference image acquisition assembly to acquire a high-resolution spectral cube. The apparatus enables rapid access to high-resolution spectral images, thereby speeding up the process of using spectral images for medical diagnosis.

8 Claims, 3 Drawing Sheets

(56) References Cited

FOREIGN PATENT DOCUMENTS

| | | | | | |
|---|---|---|---|---|---|
| CN | 108414086 | A | * | 8/2018 | ............ G01J 3/2823 |
| CN | 109579994 | A | * | 4/2019 | |
| CN | 110462679 | A | | 11/2019 | |
| CN | 111031264 | A | | 4/2020 | |
| CN | 112098337 | A | | 12/2020 | |
| WO | 2017121058 | A1 | | 7/2017 | |

* cited by examiner

HIGH-RESOLUTION SPECTRAL IMAGE FAST ACQUISITION APPARATUS AND METHOD

CROSS REFERENCE TO RELATED APPLICATIONS

This application is a continuation application of PCT/CN2021/105716 filed on 2021 Jul. 12, which claims priority to CN patent application NO. 202010896214.7 filed on 2020 Aug. 31. The contents of the above-mentioned applications are all hereby incorporated by reference.

TECHNICAL FIELD

The present invention relates to the technical field of images and in particular to a high-resolution spectral image fast acquisition apparatus and method.

BACKGROUND ART

Hyperspectral image has two spatial dimensions and one spectral dimension, can provide information about tissue physiology, morphology, and composition and is therefore widely used in the disease diagnosis and image-guided surgery. Cells in a disease state have a different structure or metabolic rate than normal, and thus have a different fluorescence emission spectrum, so that the fluorescence hyperspectral image has the ability to diagnose a disease early in the disease.

At present, in the field of pathological imaging, the acquisition of spectral image and fluorescence spectral image mostly uses the method of pushbroom or the method of staring to acquire, but these two methods will cause huge time expense; filter switching needs to constantly replace a filter, and will inevitably cause mechanical vibration in the process of image acquisition, reducing the quality of image acquisition; therefore, these drawbacks of the existing spectral image acquisition methods have seriously hindered the development of spectral image for disease diagnosis in the clinical medicine.

The disclosure of the above background art content is only used to assist understanding the concept and technical solution of the present invention, which does not necessarily belong to the prior art of the present patent application. The above background art should not be used to evaluate the novelty and inventive step of the present application in the case where there is no clear evidence indicating that the above content has been disclosed at the filing date of the present patent application.

SUMMARY OF THE INVENTION

In order to solve the above technical problem, the present invention proposes a high-resolution spectral image fast acquisition apparatus and method capable of rapidly acquiring high-resolution spectral images, thereby accelerating the process of using spectral images for medical diagnosis. In order to achieve the above object, the present invention adopts the following technical solution. The invention discloses a high-resolution spectral image fast acquisition apparatus, comprising an illumination source, an objective lens, a beam splitter, a single shot spectral image acquisition assembly and a reference image acquisition assembly, wherein the objective lens is used to align a sample to be measured; the illumination source is used to project an illumination light onto the sample to be measured so that the sample to be measured is amplified by the objective lens; amplified light passes through the beam splitter so as to be divided into two parts of light, wherein one part of light enters the single shot spectral image acquisition assembly so as to acquire a low-resolution spectral cube of the sample to be measured, and another part of the light enters the reference image acquisition assembly to acquire a high-resolution spectral cube of the sample to be measured.

Preferably, the single shot spectral image acquisition assembly comprises a mirror array, a lens, a prism, and a first camera, wherein the mirror array comprises a plurality of mirrors arranged at different angles, and the reference image acquisition assembly comprises a liquid crystal tunable filter and a second camera; wherein a part of light entering the single shot spectral image acquisition assembly sequentially passes through the mirror array, the lens, the prism and the first camera to obtain the low-resolution spectral cube of the sample to be measured, and another part of the light entering the reference image acquisition assembly sequentially passes through the liquid crystal tunable filter and the second camera to obtain the high-resolution spectral cube of the sample to be measured.

Preferably, the mirror array comprises a plurality of elongated mirrors, wherein the plurality of elongated mirrors are arranged in a widthwise array, and the plurality of elongated mirrors are respectively rotated around a widthwise axis to be arranged at different angles.

Preferably, the central axes in the width direction of each of the elongated mirrors arranged in the array coincide, and each of the elongated mirrors is respectively rotated around the coinciding central axes and arranged at different angles.

The present invention also discloses a high-resolution spectral image fast acquisition method applying the high-resolution spectral image fast acquisition apparatus described above, comprising the steps of:

S1: placing a sample to be measured in a position where an objective lens can be aligned, and projecting an illumination light by an illumination source onto the sample to be measured;

S2: acquiring a plurality of images with a same wavelength band in different spatial positions by the first camera according to a plurality of mirrors arranged at different angles in the mirror array, and splicing the plurality of images to obtain a low-resolution spectral image of the sample to be measured under a current wavelength band;

S3: adjusting a liquid crystal tunable filter to allow the light of the wavelength band of the current illumination light to pass through, and obtaining by the second camera a high-resolution spectral image of the sample to be measured under the current wavelength band;

S4: adjusting the wavelength band of the illumination light of the illumination source a plurality of times, at the same time, repeating step S2 a plurality of times to obtain a plurality of low-resolution spectral images of the sample to be measured under different wavelength bands, and repeating step S3 a plurality of times to obtain a plurality of high-resolution spectral images of the sample to be measured under different wavelength bands;

S5: stacking a plurality of low-resolution spectral images of the sample to be measured under different wavelength bands to obtain a low-resolution spectral cube of the sample to be measured, and stacking a plurality of high-resolution spectral images of the sample to be measured under different wavelength bands to obtain a high-resolution spectral cube of the sample to be measured;

S6: training a neural network by using the low-resolution spectral cube as an input and the high-resolution spectral cube as an output, and obtaining a neural network capable of converting the low-resolution spectral cube into the high-resolution spectral cube after the training is completed; and S7: quickly acquiring the high-resolution spectral images by using the low-resolution spectral images of the sample to be measured acquired by the first camera in conjunction with the neural network after the training is completed.

Preferably, before the projecting an illumination light by an illumination source onto the sample to be measured in step S1, it further comprises fixed-focusing the sample to be measured by using two-channel mutual information.

Preferably, the fixed-focusing the sample to be measured by using two-channel mutual information specifically comprises illuminating the sample to be measured with a coherent light of red and green colors from different directions, and checking whether there is a displacement between red and green channels of images acquired by the first camera or second camera; if there is a displacement, adjusting a position of the sample to be measured according to the displacement so that the sample to be measured is in an in-focus position; and if there is no displacement, the sample to be measured is already in the in-focus position and is not adjusted.

Preferably, the liquid crystal tunable filter is capable of filtering over a wavelength range of 420-730 nm with a half-height width of 12 nm and a tuning accuracy of 0.1 nm.

Preferably, the sample to be measured is a pathological section or a fluorescent sample.

Compared to the prior art, the advantageous effects of the present invention are as follows. The high-resolution spectral image fast acquisition apparatus proposed by the present invention can simultaneously acquire a low-resolution spectral cube and a high-resolution spectral cube of the same sample to be measured as a training set of neural network. Furthermore, combining with the ability of neural network deep learning to perform image super-resolution and after obtaining a well-trained neural network, the low-resolution spectral image obtained from shooting by the single shot spectral image acquisition assembly can be converted into a high-resolution image with a very short time expenditure. It can not only achieve the speed of spectral image acquisition that cannot be achieved by other methods, but also ensure that the acquired image has a high spatial resolution, so as to further accelerate the process of using spectral images for medical diagnosis.

DETAILED DESCRIPTION OF THE INVENTION

Figure 1:
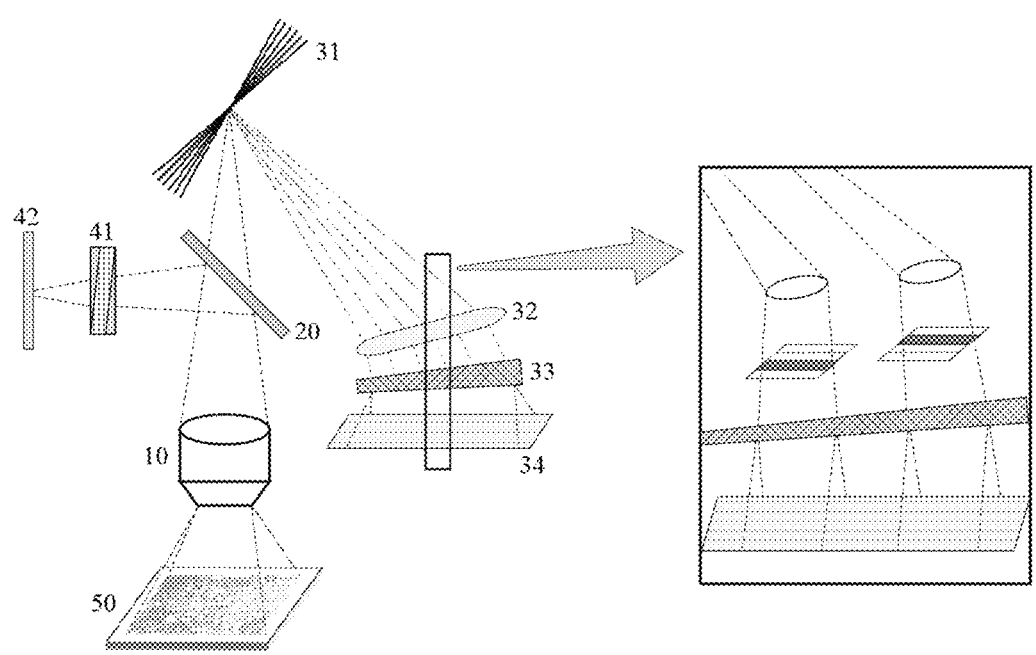
FIG. 1 is a light path schematic diagram of a high-resolution spectral image fast acquisition apparatus in accordance with a preferred embodiment of the present invention.

In order that the technical problems, technical solutions and advantages to be solved by the embodiments of the present invention can be more clearly understood, the present invention will now be described in further detail with reference to the accompanying drawings and embodiments. It should be understood that the particular embodiments described herein are illustrative only and are not limiting.

It will be understood that when an element is referred to as being "fixed" or "disposed" on another element, it can be directly on the other element or indirectly on the other element. When an element is referred to as being "connected" to another element, it can be directly or indirectly connected to the other element. In addition, the connection may be used as either a fixing function or a circuit communication function.

It should be understood that the terms "length", "width", "upper", "lower", "front", "rear", "left", "right", "vertical", "horizontal", "top", "bottom", "inner", "outer" and the like are based on the directional or positional relationships shown in the drawings. It is merely for the purpose of describing the present application and simplifying the description, and is not intended to indicate or imply that a particular orientation, configuration and operation of the referenced device or element is required and should not be construed as limiting the scope of the present invention.

Furthermore, the terms "first" and "second" are used for descriptive purposes only and are not to be construed as indicating or implying relative importance or implicitly indicating the number of technical features indicated. Thus, a feature defined as "first" or "second" may explicitly or implicitly comprise one or more of the features. In the description of the embodiments of the present invention, the meaning of "plurality" is two or more, unless specifically limited otherwise.

As shown in FIG. 1, the high-resolution spectral image fast acquisition apparatus of the preferred embodiment of the present invention includes an illumination source (not shown), an objective lens 10, a beam splitter 20, a single shot spectral image acquisition assembly and a reference image acquisition assembly, wherein single shot spectral image acquisition assembly includes a mirror array 31, a lens 32, a prism 33 and a first camera 34; the mirror array 31 includes a plurality of mirrors arranged at different angles; the reference image acquisition assembly includes a liquid crystal tunable filter 41 and a second camera 42, wherein the objective lens 10 is used to align the sample to be measured, and the illumination source is used to project an illumination light onto the sample to be measured 50 so that the sample to be measured 50 is magnified by the objective lens 10, and the amplified light passes through the beam splitter 20 to be divided into two parts; one part of the light successively passes through the mirror array 31, the lens 32, the prism 33 and the first camera 34 to obtain a low-resolution spectral cube of the sample to be measured; another part of the light successively passes through the liquid crystal tunable filter 41 and the second camera 42 to obtain the spectral images of the narrow wavelength band; the spectral images of different wavelength bands can be obtained by adjusting liquid crystal tunable filter 41 and combined into the high-resolution spectral cube.

Specifically, the mirror array 31 comprises a plurality of elongated mirrors, wherein the plurality of elongated mirrors are arranged in an array along a width direction, and the plurality of elongated mirrors are respectively rotated to different angles and arranged fixedly around a widthwise axis; further, the central axes in the width direction of each of the elongated mirrors arranged in the array coincide, and each of the elongated mirrors is respectively rotated around the coinciding central axes to be arranged at different angles and fixed.

Figure 2:
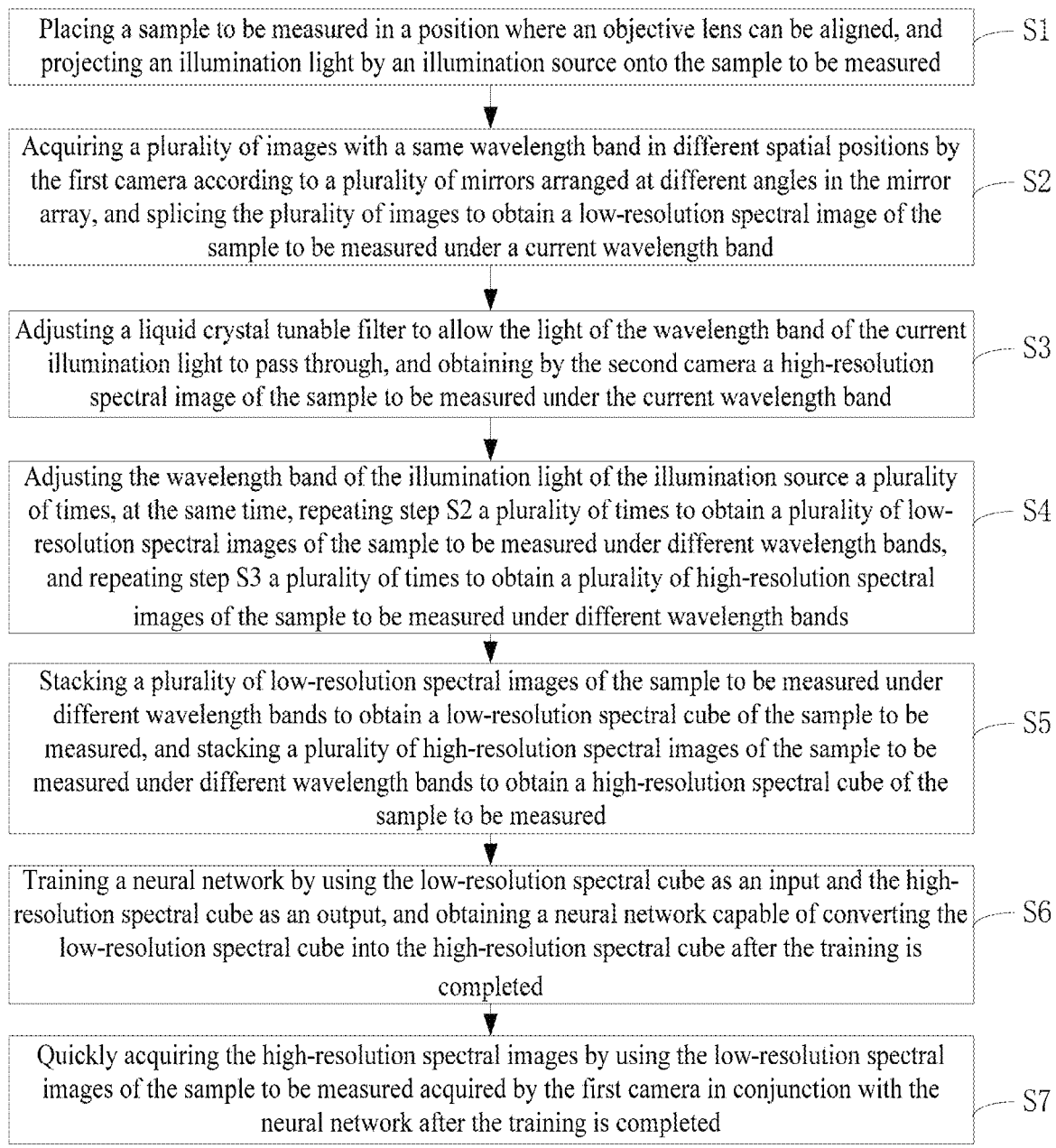
FIG. 2 is a schematic flow diagram of a high-resolution spectral image fast acquisition method in accordance with a preferred embodiment of the present invention.

As shown in FIG. 2, the high-resolution spectral image fast acquisition method of the preferred embodiment of the present invention applying the above-mentioned high-resolution spectral image fast acquisition apparatus, comprises the following steps:

S1: placing a sample to be measured in a position where an objective lens can be aligned, and projecting an illumination light by an illumination source onto the sample to be measured. Specifically, moving the object stage enables the objective lens to align with a certain spatial position of the sample to be measured, and the in-focusing is performed by means of dual-channel mutual information, and then the illumination source projects the illumination light onto the sample to be measured to illuminate the sample to be measured in the current field of view;

Here, the in-focusing by means of dual-channel mutual information includes illuminating the sample to be measured (e. g. a pathological section sample) with red and green coherent light from different directions; if the image of the sample to be measured is in the in-focus position, there is no displacement between the image red and green channels acquired by first camera or second camera; if the sample to be measured is in an out-of-focus position, there is a displacement between the image red and green channels acquired by first camera or second camera; furthermore, the displacement is linear with a defocus amount, and the defocus amount information can be obtained by calculating the displacement between the red and green channels and adjusted to the in-focus state in the current field of view. The in-focus speed of this method is much faster than that of the traditional method, which can shorten the whole slide image acquisition time.

S2: acquiring a plurality of images with a same wavelength band in different spatial positions by the first camera according to a plurality of mirrors arranged at different angles in the mirror array, and splicing the plurality of images to obtain a low-resolution spectral image of the sample to be measured under a current wavelength band.

The first camera in the single shot spectral image acquisition assembly only needs one shot to obtain the low-resolution spectral image of the sample to be measured; wherein the mirror array cuts the current field of view image into strips and projects same at different angles; the light projected at different directions is adjusted by the lens and split by the prism, and then the light reaches the camera photosensitive surface, that is to say, the mirror array divides the images; the images dispersed at different spatial positions of the current field of view image covers the camera photosensitive surface; and the low-resolution spectral image of the sample to be measured of the current field of view at a certain wavelength band can be obtained by splicing the images with different spatial positions of the sample at the same wavelength band together.

S3: adjusting a liquid crystal tunable filter to allow the light of the wavelength band of the current illumination light to pass through, and obtaining by synchronously driving the second camera a high-resolution spectral image of the sample to be measured under the current wavelength band. Here, by adjusting the liquid crystal tunable filter (LCTF), only light of a certain narrow wavelength band can be allowed to pass through the device, and the second camera can get the images of this wavelength band.

S4: adjusting the wavelength band of the illumination light of the illumination source a plurality of times, at the same time, repeating step S2 a plurality of times to obtain a plurality of low-resolution spectral images of the sample to be measured under different wavelength bands, and repeating step S3 a plurality of times to obtain a plurality of high-resolution spectral images of the sample to be measured under different wavelength bands.

When the wavelength band of the illumination light of the illumination source is adjusted every time, the liquid crystal tunable filter (LCTF) is adjusted accordingly, so that the corresponding light of the narrow wavelength band passes through, and the high-resolution spectral image of the sample to be measured of the corresponding wavelength band can be acquired. The liquid crystal tunable filter (LCTF) can make filtering in the wavelength range of 420-730 nm with a half-height width of 12 nm and an adjustment accuracy of 0.1 nm, and the high spectral resolution spectral images of the sample to be measured can be obtained by continuously adjusting the liquid crystal tunable filter (LCTF).

S5: stacking a plurality of low-resolution spectral images of the sample to be measured under different wavelength bands to obtain a low-resolution spectral cube of the sample to be measured, and stacking a plurality of high-resolution spectral images of the sample to be measured under different wavelength bands to obtain a high-resolution spectral cube of the sample to be measured.

Figure 3:
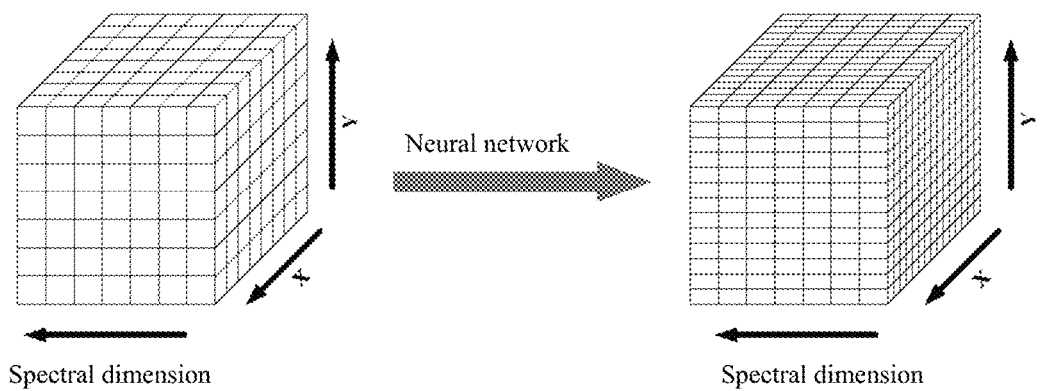
FIG. 3 is a schematic diagram of the neural network super resolution process.

S6: training a neural network by using the low-resolution spectral cube as an input and the high-resolution spectral cube as an output, and obtaining a neural network capable of converting the low-resolution spectral cube into the high-resolution spectral cube after the training is completed; wherein, as shown in FIG. 3, it is a schematic diagram of a method for converting the low-resolution spectral image into the high-resolution spectral image via the neural network, and the information on the spectral dimension of the spectral image cube is more abundant after the conversion from the neural network;

S7: quickly acquiring the high-resolution spectral images by using the low-resolution spectral images of the sample be measured acquired by the first camera in conjunction with the neural network after the training is completed, so as to realize the rapid acquisition of high-resolution spectral images.

In the high-resolution spectral image fast acquisition method of the preferred embodiment of the present invention, before completing the neural network training, it is necessary to simultaneously use two cameras shown in FIG. 1 to respectively acquire the low-resolution spectral cube and the high-resolution spectral cube; and the neural network is trained by the acquired low-resolution spectral cube and the high-resolution spectral cube; and after completing the neural network training, the high-resolution spectral images are obtained only starting the single shot spectral image acquisition assembly, acquiring the low-resolution spectral cube from the first camera, and combining the trained neural network to improve the spatial resolution, as shown in FIG. 3.

In the present embodiment, the first camera is a single-shot spectral image acquisition camera, and only one shot is required to acquire the low-resolution spectral image of the sample to be measured by using the single-shot spectral image acquisition camera. The images at different spatial positions of the sample to be measured are divided into long strips and projected to different directions by the mirror array, the light in the different directions is projected onto the prism after being adjusted by the lens for light splitting, and the images after being split by the prism are all collected on different positions of the camera sensor. The number of pixels of the camera sensor is limited, and the number of pixels of the camera sensor is equal to the number of voxels of the spectral cube. Therefore, the spatial resolution of the spectral cube obtained at this time is low. The second camera is a reference image acquisition camera, and multiple images acquired by the reference image acquisition camera can be combined into one spectral cube with high spatial resolution and spectral resolution, wherein the adjustment of liquid crystal tunable filter (LCTF) is performed in coordination with the shooting of the reference image acquisition camera; it is ensured that each side of the camera acquires the high spatial resolution, corresponding to the sample images of different wavelength bands; due to the development of LCTF, the adjustable spectral resolution of LCTF has reached a very high level, and the component switches quickly and does not generate mechanical vibration compared with the traditional design of switching filter; and the multiple image images stacked together will result in a spectral cube with very high spatial resolution. Since the above-mentioned obtained low-resolution spectral cube and high-resolution spectral cube are obtained under the same optical path condition with respect to the same sample to be measured, the neural network can be trained by taking them as a training set of the neural network. The neural network of high-resolution spectral cube can be obtained by inputting the low-resolution spectral cube through training, so that the high-resolution spectral images can be obtained quickly by the single-shot spectral image acquisition camera in actual use; and it has practical significance to accelerate the process of using spectral images for medical diagnosis.

Among them, the sample to be measured in the high-resolution spectral image fast acquisition apparatus and method of the preferred embodiment of the present invention may be either a pathological section or a fluorescent sample.

The high-resolution spectral image fast acquisition apparatus and method of the preferred embodiment of the present invention makes full use of the ability of deep learning to perform image super-resolution in the process of spectral image acquisition, proposes a way to acquire the whole slide high-resolution spectral image at an extremely fast speed, and converts the low-resolution spectral image acquired by a single-shot spectral image acquisition assembly into the high-resolution spectral image via the neural network, so as to realize the rapid acquisition of high-resolution spectral images.

Those skilled in the art will appreciate that embodiments of the invention may be provided as a method, system, or computer program product. Accordingly, the present invention may take the form of an entire hardware embodiment, an entire software embodiment, or an embodiment combining software and hardware aspects. Furthermore, the present invention may take the form of a computer program product embodied on one or more computer-usable storage media (including, but not limited to, magnetic disk storage, CD-ROM, optical storage, and the like) having computer-usable program code embodied therein.

The present invention is described with reference to flowchart illustrations and/or block diagrams of methods, devices (systems), and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing device, create a unit for implementing the functions specified in a flow or flows in the flowchart and/or a block or blocks in the block diagram.

These computer program instructions may also be stored in a computer-readable memory that can direct a computer or other programmable data processing device to function in a particular manner, such that the instructions stored in the computer-readable memory produce an article of manufacture including instruction means which implement the function specified in a flow or flows in the flowchart and/or a block or blocks in the block diagram.

These computer program instructions may also be loaded onto a computer or other programmable data processing device to cause a series of operational steps to be performed on the computer or other programmable device to produce a computer implemented process such that the instructions which are executed on the computer or other programmable device provide steps for implementing the functions specified in a flow or flows in the flowchart and/or a block or blocks in the block diagram.

The above content is a further detailed description of the present invention, taken in conjunction with specific preferred embodiments, and is not to be construed as limiting the invention. To those skilled in the art to which the invention belongs, many equivalents and obvious modifications may be made without departing from the spirit of the invention, and the same function or use is to be considered as within the scope of the invention.

The invention claimed is:

1. A high-resolution spectral image fast acquisition apparatus comprising:
   an illumination source;
   an objective lens;
   a beam splitter;
   a single shot spectral image acquisition assembly; and
   a reference image acquisition assembly,
   wherein the objective lens is used to align a sample to be measured; the illumination source is used to project an illumination light onto the sample to be measured so that the sample to be measured is amplified by the objective lens; amplified light passes through the beam splitter so as to be divided into two parts of light, wherein one part of light enters the single shot spectral image acquisition assembly so as to acquire a low-resolution spectral cube of the sample to be measured, and another part of the light enters the reference image acquisition assembly to acquire a high-resolution spectral cube of the sample to be measured,
   wherein the single shot spectral image acquisition assembly comprises:
   a mirror array;
   a lens;
   a prism; and
   a first camera,
   wherein the mirror array comprises a plurality of mirrors arranged at different angles,
   and the reference image acquisition assembly comprises a liquid crystal tunable filter and a second camera;
   wherein a part of light entering the single shot spectral image acquisition assembly sequentially passes through the mirror array, the lens, the prism and the first camera to obtain the low-resolution spectral cube of the sample to be measured, and another part of the light entering the reference image acquisition assembly sequentially passes through the liquid crystal tunable filter and the second camera to obtain the high-resolution spectral cube of the sample to be measured.

2. The high-resolution spectral image fast acquisition apparatus according to claim 1, wherein the mirror array comprises a plurality of elongated mirrors, wherein the plurality of elongated mirrors are arranged in a widthwise array, and the plurality of elongated mirrors are respectively rotated around a widthwise axis to be arranged at different angles.

3. The high-resolution spectral image fast acquisition apparatus according to claim 2, wherein the central axes in the width direction of each of the elongated mirrors arranged in the array coincide, and each of the elongated mirrors is respectively rotated around the coinciding central axes and arranged at different angles.

4. A high-resolution spectral image fast acquisition method using the high-resolution spectral image fast acquisition apparatus of claim 1, comprising the steps of:

S1: placing a sample to be measured in a position where an objective lens can be aligned, and projecting an illumination light by an illumination source onto the sample to be measured;

S2: acquiring a plurality of images with a same wavelength band in different spatial positions by the first camera according to a plurality of mirrors arranged at different angles in the mirror array, and splicing the plurality of images to obtain a low-resolution spectral image of the sample to be measured under a current wavelength band;

S3: adjusting a liquid crystal tunable filter to allow the light of the wavelength band of the current illumination light to pass through, and obtaining by the second camera a high-resolution spectral image of the sample to be measured under the current wavelength band;

S4: adjusting the wavelength band of the illumination light of the illumination source a plurality of times, at the same time, repeating step S2 a plurality of times to obtain a plurality of low-resolution spectral images of the sample to be measured under different wavelength bands, and repeating step S3 a plurality of times to obtain a plurality of high-resolution spectral images of the sample to be measured under different wavelength bands;

S5: stacking a plurality of low-resolution spectral images of the sample to be measured under different wavelength bands to obtain a low-resolution spectral cube of the sample to be measured, and stacking a plurality of high-resolution spectral images of the sample to be measured under different wavelength bands to obtain a high-resolution spectral cube of the sample to be measured;

S6: training a neural network by using the low-resolution spectral cube as an input and the high-resolution spectral cube as an output, and obtaining a neural network capable of converting the low-resolution spectral cube into the high-resolution spectral cube after the training is completed; and S7: quickly acquiring the high-resolution spectral images by using the low-resolution spectral images of the sample to be measured acquired by the first camera in conjunction with the neural network after the training is completed.

5. The high-resolution spectral image fast acquisition method according to claim 4, wherein before the projecting an illumination light by an illumination source onto the sample to be measured in step S1, it further comprises fixed-focusing the sample to be measured by using two-channel mutual information.

6. The high-resolution spectral image fast acquisition method according to claim 5, wherein the fixed-focusing the sample to be measured by using two-channel mutual information specifically comprises illuminating the sample to be measured with a coherent light of red and green colors from different directions, and checking whether there is a displacement between red and green channels of images acquired by the first camera or second camera; if there is a displacement, adjusting a position of the sample to be measured according to the displacement so that the sample to be measured is in an in-focus position; and if there is no displacement, the sample to be measured is already in the in-focus position and is not adjusted.

7. The high-resolution spectral image fast acquisition method according to claim 4, wherein the liquid crystal tunable filter is capable of filtering over a wavelength range of 420-730 nm with a half-height width of 12 nm and a tuning accuracy of 0.1 nm.

8. The high-resolution spectral image fast acquisition method according to claim 4, wherein the sample to be measured is a pathological section or a fluorescent sample.

* * * * *